United States Patent
Wang (10) Patent No.: US 6,257,000 B1
(45) Date of Patent: Jul. 10, 2001

(54) FLUID STORAGE AND DISPENSING SYSTEM FEATURING INTERIORLY DISPOSED AND EXTERIORLY ADJUSTABLE REGULATOR FOR HIGH FLOW DISPENSING OF GAS

(76) Inventor: Luping Wang, 41 Greenknoll Dr., Brookfield, CT (US) 06804

( * ) Notice: Subject to any disclaimer, the term of this patent is extended or adjusted under 35 U.S.C. 154(b) by 0 days.

(21) Appl. No.: 09/532,268

(22) Filed: Mar. 22, 2000

(51) Int. Cl.[7] .............. F17C 7/04; F17C 13/02; B67D 5/00
(52) U.S. Cl. ................... 62/48.1; 62/49.2; 222/3
(58) Field of Search .................. 62/46.1, 45.1, 62/48.1, 49.1; 222/3

(56) References Cited

U.S. PATENT DOCUMENTS

| | | | |
|---|---|---|---|
| 2,043,632 | * 6/1936 | Stover | 222/3 |
| 4,211,086 | * 7/1980 | Leonard et al. | 62/48.1 |
| 5,169,119 | * 12/1992 | Duggal et al. | 251/74 |
| 5,197,710 | * 3/1993 | Wass et al. | 251/129.15 |
| 6,089,027 | * 7/2000 | Wang et al. | 62/46.1 |
| 6,101,816 | * 8/2000 | Wang et al. | 62/48.1 |

* cited by examiner

Primary Examiner—William Doerrler
(74) Attorney, Agent, or Firm—Oliver A. Zitzmann; Steven J. Hultquist; Margaret Chappuis (57) ABSTRACT

A fluid storage and dispensing system including a vessel for holding a fluid, an adjustable set point pressure regulator in the interior volume of the vessel, a dispensing assembly in fluid flow communication with the regulator for dispensing fluid at a pressure determined by the set point of the regulator, and an adjusting assembly exterior to the vessel for in situ adjustment of the set point of the internally disposed regulator. By such arrangement, fluid storage and dispensing operations can have respectively differing regulator set point pressures, as for example a sub-atmospheric pressure set point for storage and a super-atmospheric pressure set point for dispensing.

50 Claims, 6 Drawing Sheets

FLUID STORAGE AND DISPENSING SYSTEM FEATURING INTERIORLY DISPOSED AND EXTERIORLY ADJUSTABLE REGULATOR FOR HIGH FLOW DISPENSING OF GAS

BACKGROUND OF THE INVENTION

1. Field of the Invention

This invention relates to a fluid storage and gas dispensing system that may be utilized to store high pressure liquid or other fluid, for dispensing of gas from the system and use of the dispensed gas in an application such as the manufacture of semiconductor devices and materials.

2. Description of the Related Art

In a wide variety of industrial processes and applications, there is a need for a reliable source of process fluid(s).

For example, a safe, reliable and efficient fluid supply source is desirable in the field of semiconductor manufacturing, ion implantation, manufacture of flat panel displays, medical intervention and therapy, water treatment, emergency breathing equipment, welding operations, space-based delivery of liquids and gases, etc.

U.S. patent application Ser. No. 09/067,393 filed Apr. 28, 1998 in the names of Luping Wang and Glenn M. Tom describes a fluid storage and gas dispensing system including a storage and dispensing vessel for holding a fluid, e.g., a liquid at appropriate pressure whose vapor constitutes the fluid to be dispensed, or alternatively a compressed gas. The vessel includes an outlet port and is equipped with a dispensing assembly coupled to the outlet port, for example a valve head assembly including a dispensing valve and an outlet for selective discharge of gas deriving from liquid or compressed gas in the vessel.

In the Wang et al. system, a fluid pressure regulator is associated with the outlet port, and may be at least partially interiorly disposed in the vessel, optionally coupled with a phase separator assembly to prevent liquid from leaking to the dispensing valve and outlet when the fluid in the vessel is in the form of a liquefied gas. The fluid regulator preferably is fully interiorly disposed in the vessel, to minimize the possibility of impact and environmental exposure in use, and to minimize the leak path of the contained fluid from the vessel, so that a single weld or seam can be used at the outlet port, to seal the vessel.

The regulator is a flow control device, which can be set at a predetermined pressure level, to dispense gas or vapor from the cylinder at such pressure level. The pressure level set point may be super-atmospheric, sub-atmospheric or atmospheric pressure, depending on the dispensing conditions, and the mode of gas discharge from the vessel.

U.S. patent application Ser. No. 09/300,994 filed Apr. 28, 1999 in the names of Luping Wang and Glenn M. Tom for "FLUID STORAGE AND DISPENSING SYSTEM," is a continuation in part of the above-described U.S. patent application Ser. No. 09/067,393, and describes further aspects of the "regulator in a bottle" apparatus, including arrangements employing a double-stage (or multi-stage) fluid pressure regulator, optionally with a particulate filter assembly, interiorly disposed in the vessel. Such continuation in part application also discloses fluid storage and dispensing vessel arrangements in which the vessel encloses an interior volume of less than about 50 liters and has an inlet opening larger than 1 inch NGT, as well as embodiments in which the fluid storage and dispensing vessel contains a physical adsorbent material holding adsorbed gas at an internal pressure of from about 50 psig to about 5000 psig.

In the practice of the regulator in a bottle system of the above-discussed U.S. patent application Ser. No. 09/300,994 and U.S. patent application Ser. No. 09/067,393, there is a need for further improvement in certain aspects of the structure and operation of the fluid storage and dispensing system.

More specifically, when a set point regulator (SPR) is set at a predetermined pressure set point, and then interiorly disposed in the interior volume of the fluid storage and dispensing vessel of the system, the set point pressure is not thereafter adjustable during the use of the vessel.

This is disadvantageous, since the SPR is typically set for sub-atmospheric pressure release of gas, in order to maximize the safety of the fluid storage and dispensing system. Such sub-atmospheric pressure set point is advantageous during storage and transport of the vessel. In subsequent use, however, the pressure and fluid flow requirements of the gas-consuming process facility in which the fluid storage and dispensing system is used may dictate that fluid be dispensed at super-atmospheric pressure. For example, in a semiconductor manufacturing facility, the associated tool pressure may be >760 Torr, or higher pressures otherwise may be necessary or desirable to achieve suitably high flow rates in the process facility. If the SPR is set at super-atmospheric pressure and then installed in the vessel, the safety of the fluid storage and dispensing system is compromised by the super-atmospheric pressure set point during transport and storage of the system, as well as during off-line (stand-by) periods in the process facility.

Another deficiency of the prior fluid storage and dispensing system is that it is not able to monitor pressure in the storage and dispensing vessel. As a result, it is difficult to determine or predict in advance when the vessel will be empty.

It would therefore be highly desirable, and is accordingly an object of the present invention, to provide a fluid storage and dispensing system that overcomes the aforementioned conflicting pressure level requirements between the storage/transport sub-atmospheric pressure levels desired for safety reasons on the one hand, and the super-atmospheric pressure operating levels desired in many applications on the other hand.

It is another object of the invention to provide a fluid storage and dispensing system comprising a storage and dispensing system with a regulator device interiorly positioned in the vessel, in which the amount of the fluid in the vessel is readily determinable.

It is another object of the invention to provide a fluid storage and dispensing system that allows for sub-atmospheric SPR set-point pressure during storage and transportation and super-atmospheric SPR set-point pressure during use.

It is another object of the invention to provide an improved fluid storage and dispensing system for the selective dispensing of gases, characterized by significant advantages in cost, ease of use, and performance.

Other objects and advantages of the invention will be more fully apparent from the ensuing disclosure and appended claims.

SUMMARY OF THE INVENTION

The present invention relates to a system for storage and dispensing of a fluid, for use in applications such as the manufacture of semiconductor products.

In one aspect, the present invention relates to a fluid storage and dispensing system, comprising:

a fluid storage and dispensing vessel enclosing an interior volume for holding a fluid, wherein the vessel includes an opening;

a fluid dispensing assembly coupled in fluid flow communication with the opening and arranged for selective dispensing of fluid;

an adjustable set point pressure regulator in the interior volume of the fluid storage and dispensing vessel, and arranged to flow fluid therethrough to the fluid dispensing assembly at a set point-determined pressure during said selective dispensing of fluid; and set point adjustment means exterior to the fluid storage and dispensing vessel, controllingly linked to the adjustable set point pressure regulator to selectively vary the set point of the adjustable set point pressure regulator.

The invention in another aspect relates to a fluid storage and dispensing system, comprising:

a fluid storage and dispensing vessel enclosing an interior volume for holding a fluid, wherein the vessel includes an opening;

a fluid dispensing assembly coupled in fluid flow communication with the opening and arranged for selective dispensing of fluid;

an adjustable set point pressure regulator in the interior volume of the fluid storage and dispensing vessel, and arranged to flow fluid therethrough to the fluid dispensing assembly at a predetermined pressure set point during said selective dispensing of fluid; and means for coupling the adjustable set point regulator in the interior volume of the fluid storage and dispensing vessel, with a pressure set point adjusting means external to the fluid storage and dispensing vessel.

A further aspect of the invention relates to a fluid storage and dispensing system, comprising a flow circuit for gas dispensing, a fluid storage and dispensing vessel including an adjustable set point regulator disposed in the interior of the vessel and arranged for discharge of fluid from the vessel at a discharge pressure determined by pressure set point of the regulator, means for varying the pressure set point of the regulator, and means for monitoring pressure rise in the flow circuit while varying the pressure set point of the regulator to determine whether the vessel has reached or is approaching a fluid-depleted state.

In a still further aspect, the invention relates to a method of supplying a fluid for use thereof, comprising:

confining the fluid in a fluid storage and dispensing vessel against an adjustable set point pressure regulator in the fluid storage and dispensing vessel, wherein the adjustable set point pressure regulator is arranged to flow fluid therethrough at a set point-determined pressure during dispensing of fluid from the fluid storage and dispensing vessel; and selectively adjusting the set point of the adjustable set point pressure regulator from a locus exterior to the vessel, to provide a selected pressure set point subsequent to said adjusting.

Yet another aspect of the invention relates to a fluid storage and dispensing method, comprising:

providing a flow circuit for gas dispensing;

coupling with the flow circuit a fluid storage and dispensing vessel including an adjustable set point regulator disposed in the interior of the vessel and arranged for discharge of fluid from the vessel at a discharge pressure determined by pressure set point of the regulator; and monitoring pressure rise in the flow circuit while varying the pressure set point of the regulator to determine whether the vessel has reached or is approaching a fluid-depleted state.

Other aspects, features and embodiments in the invention will be more fully apparent from the ensuing disclosure and appended claims.

DETAILED DESCRIPTION OF THE INVENTION, AND PREFERRED EMBODIMENTS THEREOF

The disclosures of U.S. patent application Ser. No. 09/067,393 filed Apr. 28, 1998 in the names of Luping Wang and Glenn M. Tom for "FLUID STORAGE AND GAS DISPENSING SYSTEM," and U.S. patent application Ser. No. 09/300,994 filed Apr. 28, 1999 in the names of Luping Wang and Glenn M. Tom for "FLUID STORAGE AND DISPENSING SYSTEM," are hereby incorporated herein by reference in their entirety.

The present invention contemplates a fluid storage and dispensing system including a vessel for holding a fluid, an adjustable set point pressure regulator in the interior volume of the vessel, a dispensing assembly in fluid flow communication with the regulator for dispensing fluid at a pressure determined by the set point of the regulator, and an adjusting assembly exterior to the vessel for in situ adjustment of the set point of the internally disposed regulator.

By such arrangement, fluid storage and dispensing operations can have respectively differing regulator set point pressures, as for example a sub-atmospheric pressure set point for storage and a super-atmospheric pressure set point for dispensing.

Figure 1:
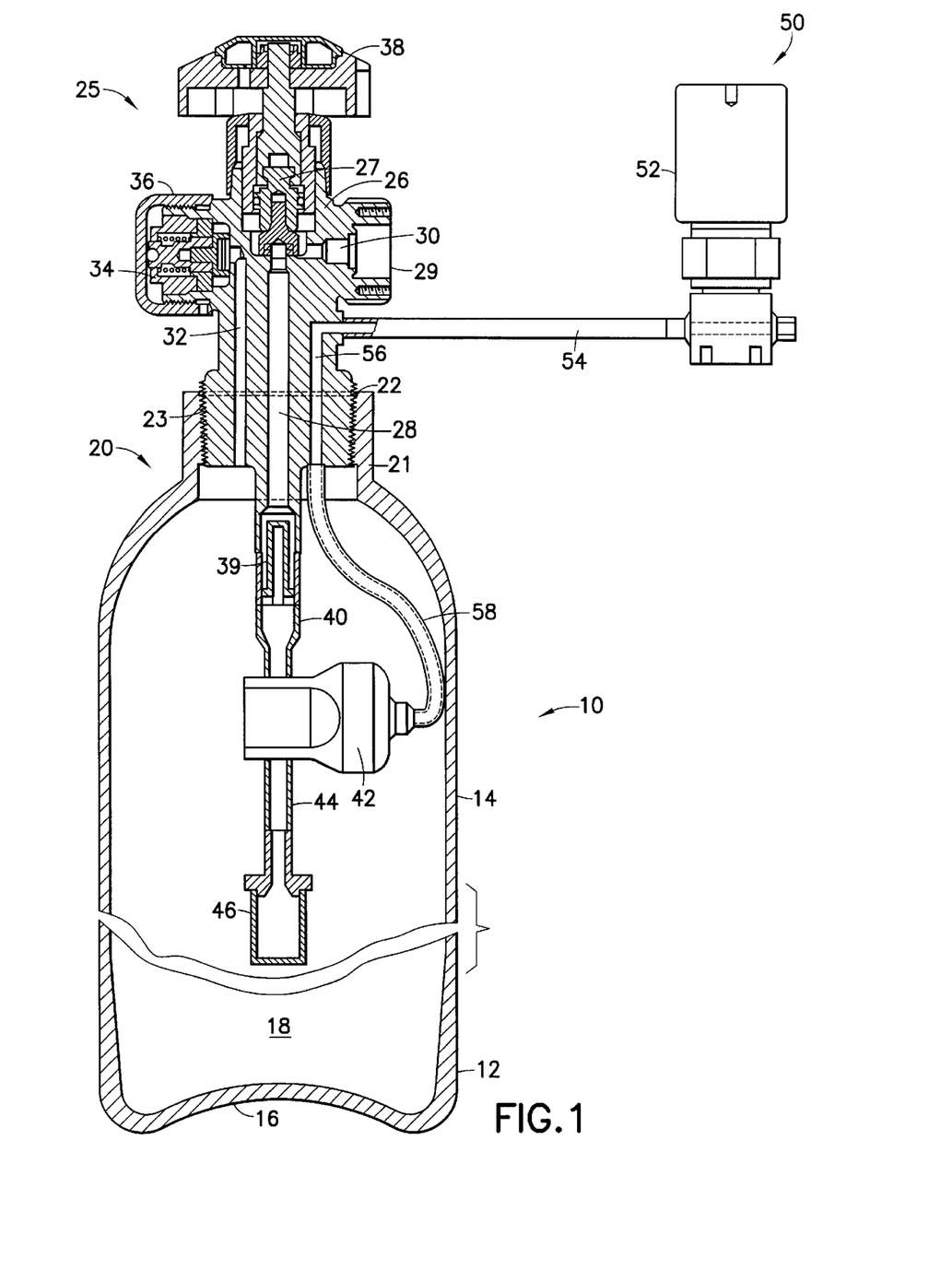
FIG. 1 is a schematic cross-sectional elevation view of a fluid storage and dispensing system according to one embodiment of the present invention.

Referring to the drawings, FIG. 1 is a schematic cross-sectional elevation view of a fluid storage and dispensing apparatus 10 according to one embodiment of the present invention.

The fluid storage and dispensing apparatus 10 features a storage and dispensing vessel 12 comprising a cylindrical sidewall 14 and a floor 16 corporately enclosing the interior volume 18 of the vessel. The side wall and floor may be formed of any suitable material of construction, e.g., metal, gas-impermeable plastic, fiber-resin composite material, etc., as appropriate to the gas to be contained in the vessel, the end use environment of the apparatus, and the pressure levels to be maintained in the vessel in storage and dispensing use.

At its upper end 20, the vessel features a neck 21 defining a port opening 22 bounded by the inner wall 23 of the neck 21. The inner wall 23 may be threaded or otherwise complementarily configured to matably engage therein a valve head 25 including a valve body 26 that may be complementarily threaded or otherwise configured for mating engagement with the inner wall 23.

In such manner, the valve head 25 is engaged with the vessel 12 in a leak-tight manner, to hold fluid therein in the interior volume 18 at the desired storage conditions.

The valve head body 26 is formed with a central vertical passage 28 therein for dispensing of gas deriving from fluid in the vessel 12. The central vertical passage 28 communicates with the gas discharge passage 30 of gas discharge port 29, as shown. The valve head body contains a valve element 27 that is coupled with the hand wheel 38, for selective manual opening of the valve to flow gas through the central vertical passage 28 to the gas discharge port 29, or alternatively manual closure of the valve to stop dispensing flow of gas from the central vertical passage 28 to the gas discharge port 29. The valve element 27 is therefore arranged downstream of the regulator, so that fluid dispensed from the vessel flows through the regulator prior to flow through the flow control valve comprising valve element 27.

In place of the hand wheel valve actuation element, there may be provided an automatic valve actuator, such as a pneumatic valve actuator, an electromechanical valve actuator, or other suitable means for automatically opening and closing the valve in the valve head.

The valve head body 26 also contains a fill passage 32 formed therein to communicate at its upper end with a fill port 34. The fill port 34 is shown in the FIG. 1 drawing as capped by fill port cap 36, to protect the fill port from contamination or damage when the vessel has been filled and placed into use for the storage and dispensing of gas from the contained fluid.

The fill passage at its lower end exits the valve head body 26 at a bottom surface thereof as shown, so that when the fill port 34 is coupled with a source of the fluid to be contained in the vessel, the fluid can flow through the fill passage and into the interior volume 18 of the vessel 12.

Joined to the lower end of valve head body 26 is an extension tube 40, optionally containing a first particle filter 39 in its upper portion, and at its lower end 44 being joined to high efficiency particle filter 46. An adjustable pressure regulator 42 is mounted on the extension tube 40 as shown. The adjustable pressure regulator 42 may be of any suitable type that provides an adjustable set point pressure, e.g., a Swagelock HFD3B regulator, commercially available from Swagelock Company (Solon, Ohio).

The high efficiency particle filter 46 at the lower end 44 of the extension tube 40 serves to prevent contamination of the regulator elements and upstream valve element 27 with particulates or other contaminating species that may be associated with the fluid flowed through the regulator and valve in the operation of the apparatus. The apparatus may also have the optional high efficiency particle filter 39 disposed in the upper portion of the extension tube to provide further particulate removal capability, to ensure high gas purity of the dispensed gas. Preferably, the regulator has at least one particle filter in series flow relationship with the regulator, e.g., upstream as well as downstream of the regulator in the fluid flow path from the vessel interior volume to the fluid dispensing assembly joined to the valve head of the apparatus.

The pressure adjustment assembly 50 for the regulator 42 comprises a pressure adjustment controller 52 which may for example include a manually actuatable controller joined to a source of pressurized inert gas or a small cylinder of compressed inert gas that is mounted inside the housing of the pressure adjustment controller 52, as well as a small vacuum pump for setting the regulator pressure set point to a sub-atmospheric pressure value. Alternatively, the pressure adjustment controller may comprise coupling structure, e.g., fittings, for selective connection of the pressure adjustment assembly to pressurized gas lines, or vacuum lines, as desired, for setting the set point of the adjustable regulator 42.

In this manner, the pressure adjustment controller 52 serves as a pneumatic controller for the regulator 42, being joined in gas flow relationship to the regulator by means of gas conduit 54 coupled in gas flow relationship to passage 56 in valve body 26. The regulator thus is fluidically adjustable as to its set point pressure, by a fluid flow controller arranged to selectively transmit a pressure set point-determining pressure to the regulator At the bottom face of the valve body 26, gas flow line 58 is joined to the valve body in flow communication with passage 56 at its upper end. At its lower end the gas flow line 58 is joined to the regulator. The gas flow line 58 may be formed of any suitable material of construction, and be of any suitable dimensional characteristics. For example, if the regulator is the aforementioned Swagelock HFD3B regulator, the gas flow line 58 may comprise a ⅛-inch inner diameter tubing.

The valve head 26 used in the FIG. 1 embodiment thus provides a three-port valve assembly—one port is the gas fill port 34, another port is the gas discharge port 29, and the third port is the pressure adjustment port for the regulator.

In operation, the set point of the regulator 42 is readily settable by manual or automatic adjustment of the pressure adjustment controller 52, to establish a controlled flow of pressurized gas to the regulator for super-atmospheric pressure set point establishment, or alternatively imposing a controlled suction (drawing of vacuum) on the regulator set point adjustment port to which gas flow line 58 is connected.

The pressure regulator is of a type including a diaphragm element coupled with a poppet retaining wafer connected to the stem of a poppet element, as part of a pressure sensing assembly that precisely controls outlet gas pressure. A slight increase in outlet pressure causes the pressure sensing assembly to contract, and a slight decrease in the outlet pressure causes pressure sensing assembly expansion, with the contraction or expansion serving to translate the poppet element to provide precise pressure control. The pressure sensing assembly has a set point that is established by a biasing pressure or vacuum determined by the manual positioning of the pressure adjustment controller 52.

By the arrangement of the fluid storage and dispensing vessel shown in FIG. 1, the pressure set point of the regulator 42 can be set at a sub-atmospheric pressure level by the pressure adjustment controller 52, for non-dispensing conditions, e.g., during storage, transport, and off-line status in the process facility, drawing a vacuum on the pressure set port of the regulator (the port of the regulator to which the gas flow line 58 is connected).

When active dispensing of gas is desired, the regulator set point pressure is adjusted to a super-atmospheric pressure level by manual adjustment of the pressure adjustment controller 52 to cause a set point establishing flow of gas to flow through gas conduit 54, passage 56 in valve body 26, and gas flow line 58. Gas conduit 54, passage 56 and gas flow line 58 thereby corporately define a fluid flow circuit coupled to the regulator.

The discharge pressure setting of the regulator 42 is therefore readily changeable to a desired pressure level, thereby setting the pressure at which gas will be discharged from the vessel when the valve element 27 is open and gas is being dispensed from the vessel 12. The set point pressure will advantageously be in a range of from sub-atmospheric pressure to super-atmospheric pressure, e.g., a pressure set point-determining range of from about 1 Torr to about 2250 psig, and more preferably from about 50 Torr to about 1500 psig.

In a typical configuration, a gas discharge line, containing a flow control valve therein, will be coupled with the discharge port 29 and the flow control valve in the gas discharge line (not shown in FIG. 1) will be opened to flow gas from the vessel 12 to the associated process facility (e.g., a semiconductor manufacturing facility or other use facility), in the dispensing mode of the fluid storage and dispensing system 10. The gas dispensed in such manner will be at a pressure determined by the set point of the regulator 42.

The above-described fluid storage and dispensing system also may be arranged to monitor the pressure of the dispensed gas to determine a near-empty condition for the vessel 12. A pressure transducer is disposed in the gas discharge line (not shown in FIG. 1) joined to the gas discharge port 29.

Since the pressure in the gas discharge line joined to port 29 is determined by the set pressure of the regulator, an increase of the set pressure will result in an increase of the downstream pressure read by the pressure transducer in the gas discharge line.

When the downstream pressure (i.e., downstream pressure) no longer responds to the external pressure increase (this can be determined by sequential incremental test increases in the regulator pressure set point), such behavior indicates that pressure in the vessel 12 is equal to or smaller than the set pressure. This condition in turn indicates that the vessel 12 is in a near-empty condition, and ready for change-out, and replacement with a fresh fluid storage and dispensing system.

The aforementioned capability can be readily implemented by integrating the fluid storage and dispensing system with a gas cabinet computer or programmable logic controller (PLC) control/monitoring system so that the pressure transducer in the gas discharge line provides monitoring data that indicates the depletion of the fluid from the fluid storage and dispensing vessel as a function of time, to determine change-out or switchover scheduling of the gas supply systems in the practice of the invention.

In general, during transportation and handling of the fluid supply and dispensing system, the regulator pressure set point will be set at a suitable sub-atmospheric pressure by exerting suction (vacuum) on the pressure set port of the valve body to which the regulator is interiorly coupled for set point adjustment. After the sub-atmospheric pressure set point is fixed for the regulator, the valve body port is closed by either a shutoff valve or a check valve in the pressure adjustment controller 52.

As mentioned, the pressure adjustment controller 52 may be constructed and arranged for connection to an existing source of vacuum or pressurization, as desired. When an external source of pressure set point gas is used, the fluid storage and dispensing system is installed in the use environment, e.g., a gas cabinet in the semiconductor manufacturing facility, and leak checked. The external pressure source then is connected to the pressure adjustment controller 52 and the controller is manually or automatically adjusted, to set the pressure set point of the regulator at the desired value.

The set point pressurizing gas may be of any suitable composition, and preferably is an inert gas such as nitrogen, argon, helium, etc.

After the fluid in the vessel 12 is consumed, the pressure to the set point pressurizing gas will be reduced to sub atmospheric pressure, so that the fluid vessel can be disconnected from the connecting flow circuitry with a discharge pressure below ambient, thereby eliminating the possibility of high pressure release of fluid from the vessel at it is uncoupled from the flow circuitry.

The ability to adjustably set the pressure setting of the interiorly disposed regulator may be employed in one embodiment of the invention to eliminate the need for a separate fill port on the valve body 26. With the regulator being adjustable in set point pressure level, the regulator 42 can be set at very high pressure to allow high pressure fluid to be filled into storage and dispensing vessel 12 through the discharge port 29 in the valve body 26. After filling, the regulator set point can be reduced to the desired level for safety. The elimination of the high pressure fill port also has the associated advantages that (1) even if the valve fails or the valve is cut off, there is no high pressure release from the vessel, since the set point regulator set pressure will be automatically set to atmospheric pressure, and therefore it will not open, and (2) without the high pressure fill port, it is not possible for the users to inadvertently open the high pressure valve and cause serious high pressure gas release.

Figure 2:
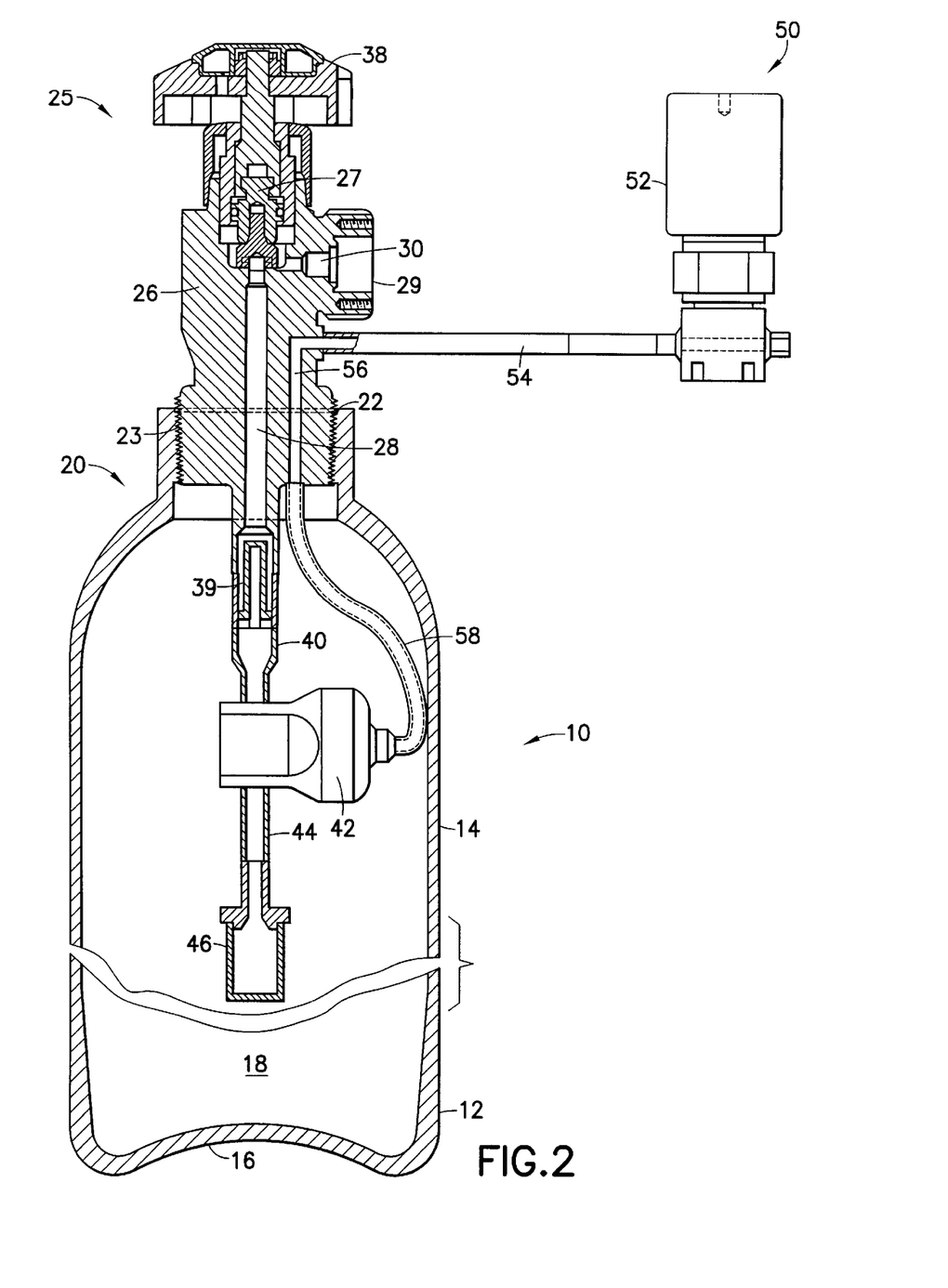
FIG. 2 is a schematic cross-sectional elevation view of a fluid storage and dispensing system according to a second embodiment of the present invention.

An illustrative two ported valve body arrangement is illustrated in FIG. 2, wherein all corresponding elements and features of FIG. 1 are correspondingly numbered in FIG. 2, for ease of reference.

As illustrated, the valve body 26 in the FIG. 2 embodiment has a single fill/discharge port 29 communicating with the central vertical passage 28, extension tube 40 and high efficiency particle filter 46. During the fill operation, the regulator set point may be adjusted to a suitably high pressure value, e.g., 1500 psig, so that high pressure gas or liquid can be flowed into the vessel 12 through the fill/discharge port 29. After the fill sequence has been completed, the regulator 42 is set to lower set point pressure, e.g., 100 Torr, so that the storage and dispensing system is in the safe mode. If the vessel valve 38 is opened, there will not be a high pressure release of gas.

Figure 3:
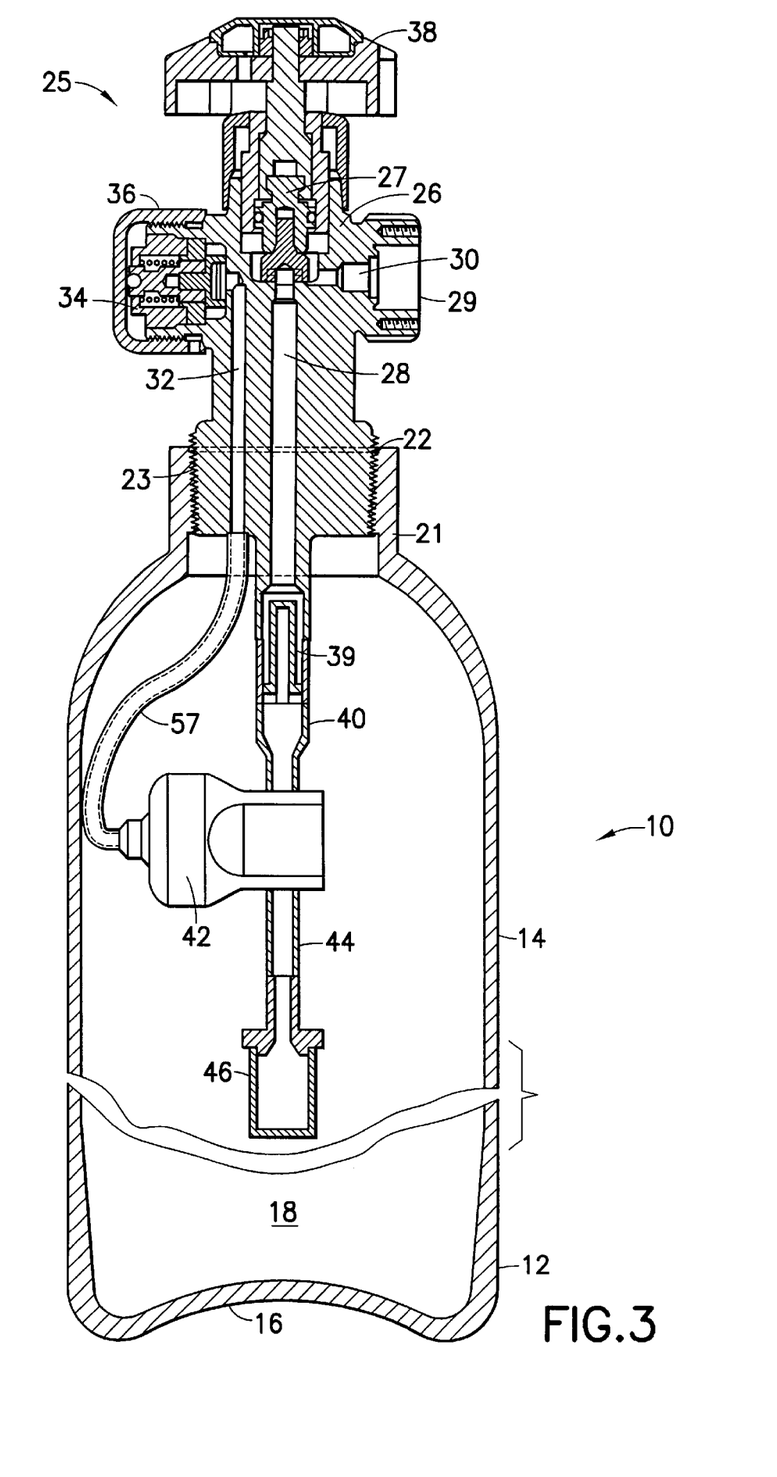
FIG. 3 is a schematic cross-sectional elevation view of a fluid storage and dispensing system according to a third embodiment of the present invention.

FIG. 3 is a schematic cross-sectional elevation view of a fluid storage and dispensing system according to a third embodiment of the present invention, featuring another two ported valve body embodiment. In the FIG. 3 drawing, all corresponding elements and features of the FIG. 1 and FIG. 2 embodiments are correspondingly numbered in FIG. 3 for ease of reference.

The FIG. 3 embodiment differs from the two-ported fluid storage and dispensing system shown in FIG. 2 in that the FIG. 3 embodiment has separate dispensing and fill ports 29 and 34, respectively, and the fill passage 32 is joined at the bottom face of valve body 26 to gas flow line 57. The gas flow line 57 at its opposite end from that joined to the valve body 26 is joined to the regulator 42.

By this arrangement, the fill port in the FIG. 3 embodiment may be coupled to a source of fluid (not shown) for initial charging of the vessel. For such charging operation, the adjustable set point regulator 42 may be set at an appropriate pressure set point to allow flow of the charged fluid into the interior volume 18 of vessel 12, through fill port 34, fill passage 32, gas flow line 57, regulator 42, extension tube 40 and particle filter 46.

Subsequent to charging, the set point of the adjustable set point regulator 42 is adjustable, by connection of the fill port 34 to a source of adjustment gas, e.g., an inert gas such as helium, argon, etc., and the set point of the regulator is adjustably set to the desired value for the subsequent dispensing operation of the system.

The vessel 12 in the FIG. 3 embodiment thereafter is arranged and operated in use by connection of the gas discharge port 29 to a dispensing assembly or manifold containing suitable flow control and monitoring means as required for the dispensing of gas from the vessel to the downstream use facility.

Figure 4:
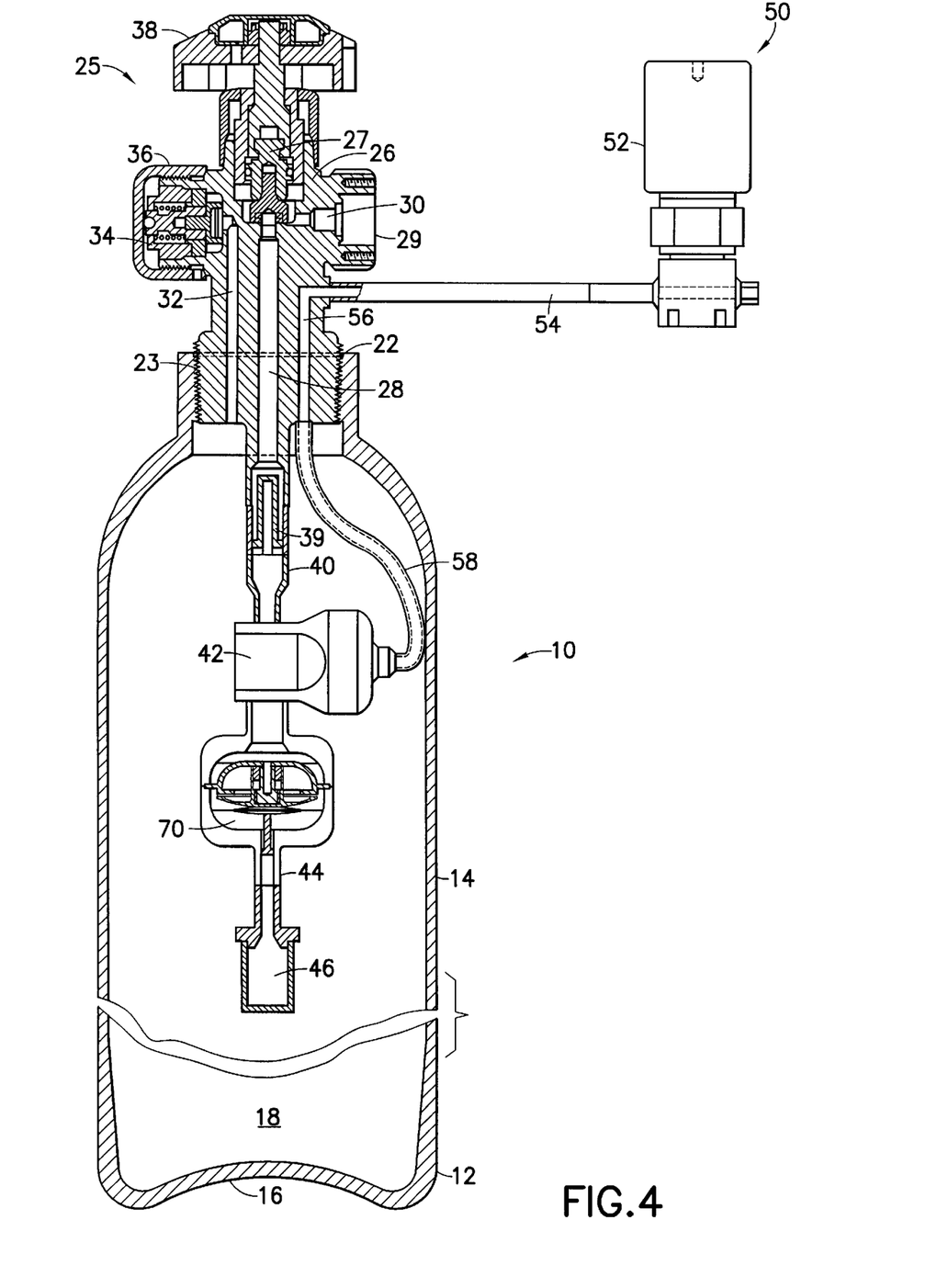
FIG. 4 is a schematic cross-sectional elevation view of a fluid storage and dispensing system according to a fourth embodiment of the present invention.

FIG. 4 is a schematic cross-sectional elevation view of a fluid storage and dispensing system according to a fourth embodiment of the present invention. The FIG. 4 embodiment features a three-port valve head body 26 having general similarity in structure to the embodiment of FIG. 1. In FIG. 4, all corresponding elements and features are numbered correspondingly to FIG. 1 for ease of reference.

The FIG. 4 embodiment, in contrast to the fluid storage and dispensing system of FIG. 1, features a second regulator 70 disposed below adjustable set point regulator 42, so that regulator 70 is upstream of regulator 42 in the flow path of the fluid being dispensed from vessel 12 (through particle filter 46, regulator 70, regulator 42, extension tube 40, central vertical passage 28, and gas discharge passage 30 of gas discharge port 29).

The regulator 70, in contrast to the adjustable set point regulator 42, is a set pressure regulator that is fixed or set at a specific pressure set point, which governs its dispensing and fluid containment operation. Thus, the regulator 70 is non-adjustable, being of fixed set point character. Concurrently, the regulator 42 is adjustable by means of the pressure adjustment assembly 50, to selectively vary the set point pressure of the regulator 42 during the use of the system.

The respective set points of the regulator 70 and the regulator 42 in the FIG. 4 embodiment may be set at any suitable values to accommodate a specific desired end use application. For example, the first or "upstream" regulator 70 may have a set point that is in a range of from about 20 psig to about 2500 psig, while the second or "downstream" regulator 42 may be selectively adjustable over a set point range that is above the pressure set point of the upstream regulator 70, e.g., in a range of from about 1 torr up to 2500 psig.

In one illustrative embodiment, the upstream regulator 70 may have a set point in the range of from about 100 psig to about 1500 psig, while the downstream regulator 42 may be adjustable to provide any desired set points in the range of from about 100 torr to about 50 psig, wherein the upstream pressure set point is above the set point of the downstream regulator.

Although the set points of the regulators may be established in any suitable ratio in relation to one another, the upstream regulator in one embodiment advantageously has a pressure set point that is at least twice the set point value (measured in the same pressure units of measurement) of the downstream regulator.

Figure 5:
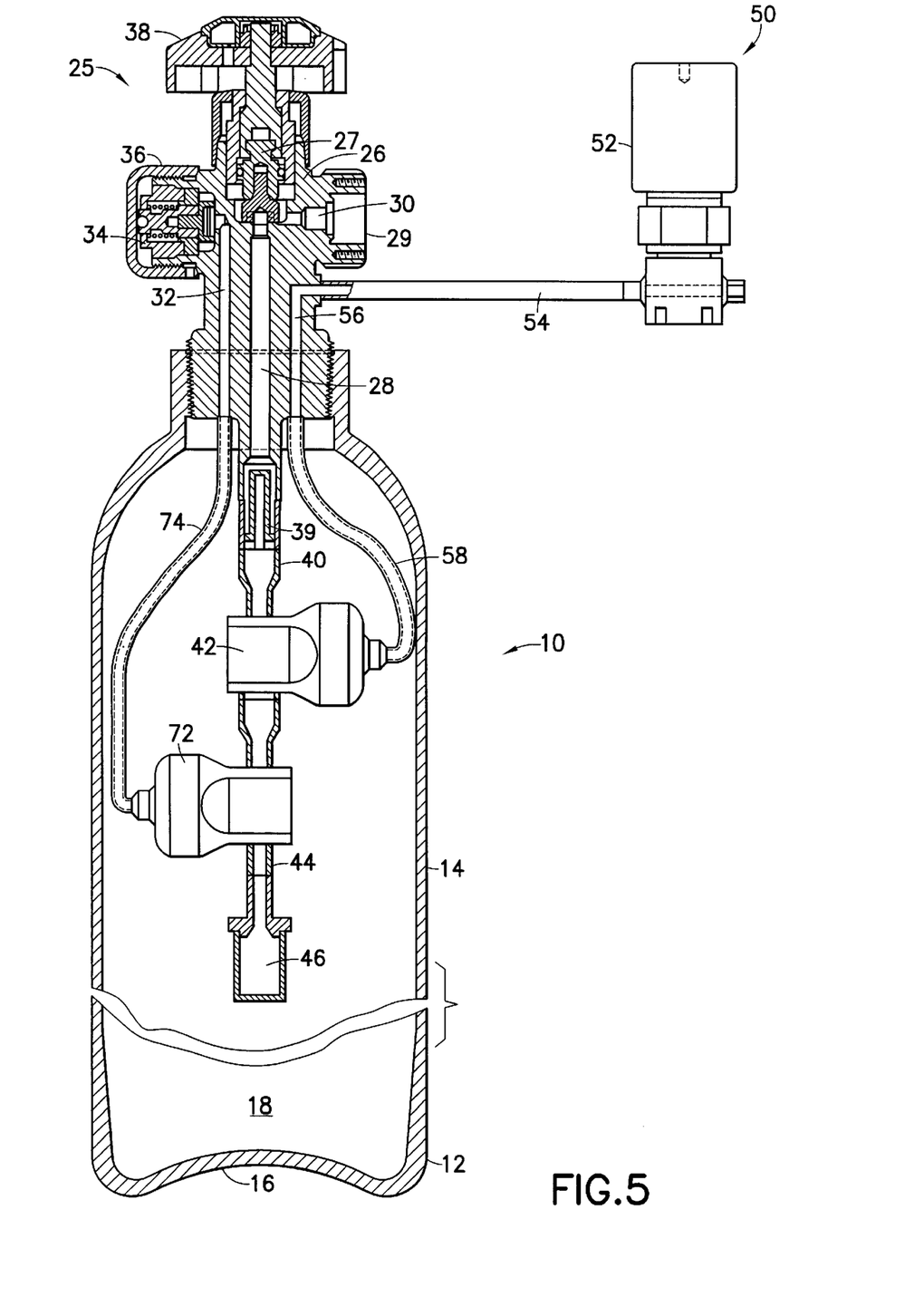
FIG. 5 is a schematic cross-sectional elevation view of a fluid storage and dispensing system according to a fifth embodiment of the present invention.

FIG. 5 is a schematic cross-sectional elevation view of a fluid storage and dispensing system according to a fifth embodiment of the present invention. The FIG. 5 embodiment features a three-port valve head body 26 having general similarity in structure to the embodiment of FIG. 1. In FIG. 5, all corresponding elements and features are numbered correspondingly to FIG. 1 for ease of reference.

The FIG. 5 embodiment, in contrast to the fluid storage and dispensing system of FIG. 1, features a second regulator 72 disposed below adjustable set point regulator 42, so that regulator 72 is upstream of regulator 42 in the flow path of the fluid being dispensed from vessel 12 (through particle filter 46, regulator 72, regulator 42, extension tube 40, central vertical passage 28, and gas discharge passage 30 of gas discharge port 29).

The FIG. 5 embodiment has separate dispensing and fill ports 29 and 34, respectively, and the fill passage 32 is joined at the bottom face of valve body 26 to gas flow line 74. The gas flow line 74 at its opposite end (opposite to the end joined to the valve body 26) is joined to the regulator 72.

By this arrangement, the fill port in the FIG. 5 embodiment may be coupled to a source of fluid (not shown) for initial charging of the vessel. For such charging operation, the adjustable set point regulator 72 may be set at an appropriate pressure set point to allow flow of the charged fluid into the interior volume 18 of vessel 12, through fill port 34, fill passage 32, gas flow line 74, regulator 72, extension tube 40 and particle filter 46.

Subsequent to charging, the set point of the adjustable set point regulator 72 is adjustable, by connection of the fill port 34 to a source of adjustment gas, e.g., an inert gas such as helium, argon, etc., and the set point of the regulator is adjustably set to the desired value for the subsequent dispensing operation of the system.

Concurrently, the regulator 42 is adjustable as to its set point by exerting pressure or vacuum on the regulator set point mechanism in regulator 42, through appropriate setting/adjustment of the pressure adjustment assembly 50.

In this manner, each of the set point pressures of the dual regulator embodiment in FIG. 5 may be separately varied, to achieve an appropriate pressure set point combination for such regulators, suitable for the specific end use of the fluid storage and dispensing system.

The vessel 12 in the FIG. 5 embodiment after filling is operated by connection of the gas discharge port 29 to a dispensing assembly or manifold containing suitable flow control and monitoring means as required for the dispensing of gas from the vessel to the downstream use facility.

As a further alternative embodiment, in modification of the fluid storage and dispensing system shown in FIG. 5, both regulator adjustment ports of the valve head body may be joined to a common adjustment gas source. Such adjustment gas source may be arranged to permit individual pneumatic adjustment of the set points of the respective regulators 42 and 72 in an independent manner, i.e., so that the set point of each regulator may be selectively varied, independent of the set point setting of the other regulator.

As yet another alternative, such common adjustment gas source may be constructed and arranged to provide an "override" function that maintains the respective individual set point pressures in a predetermined ratio or within a predetermined range in relation to one another, by appropriate microprocessor or computer control (not shown).

The present invention therefore contemplates the provision of single interiorly disposed regulator fluid storage and dispensing systems, as well as multiple regulator fluid storage and dispensing systems.

Figure 6:
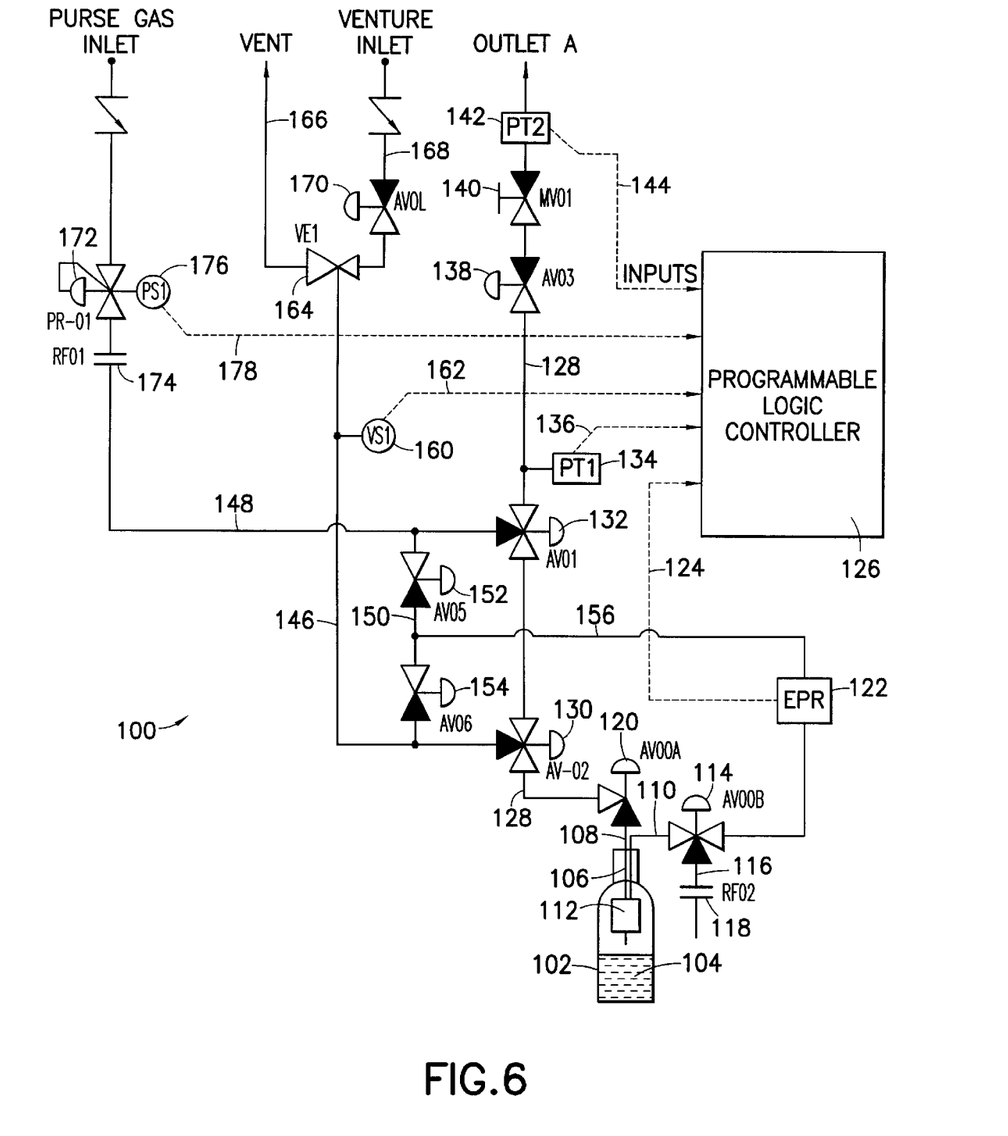
FIG. 6 is a schematic representation of a manifolded fluid storage and dispensing system depicting an illustrative embodiment of the present invention.

FIG. 6 is a schematic representation of a manifolded fluid storage and dispensing system 100 according to an illustrative embodiment of the present invention. In this system, the fill condition of the vessel may be monitored as hereinafter described, so that the approach of vessel exhaustion (depletion of the contained fluid to a near-empty condition) can be detected, to accommodate the need to change out the fluid storage and dispensing vessel or to switch over to another vessel held in a corresponding manifolded arrangement.

The FIG. 6 system as illustrated includes a fluid storage and dispensing vessel 102 containing a fluid such as compressed liquid gas 104. The vessel 102 is equipped with a valve head assembly 106 mounted in the neck port of the vessel. The valve head assembly 106 in this embodiment is a two-port valve head arrangement. One port of the valve head assembly accommodates the dispensing line 108, which extends into the interior volume of the vessel and is coupled (in pressure-controlled relationship) with the interior regulator assembly 112.

The regulator assembly 112 may comprise a single regulator arrangement, as schematically represented in FIG. 6, or a multiple regulator arrangement, e.g., of a type as illustratively described in connection with FIGS. 4 and 5 herein. The regulator assembly is connected to the adjustment line 110 through which vacuum or pressurized gas flow acts to effect desired adjustment of the regulator and achieve a predetermined set point for subsequent operation, so that the discharge pressure of the dispensed gas is controlled.

The adjustment line 110 contains a three-way valve 114 that is connected to line 116 having bleed-down flow control orifice 118 therein. Line 110 is connected with an electronic pressure regulator (EPR) 122 which may for example comprise an MKS 640 EPR unit (commercially available from MKS Instruments, Inc.). The electronic pressure regulator 122 is also connected to adjustment line 156, so that flows through lines 110 and 156 are regulated by the EPR 122.

The EPR 122 concurrently monitors the pressure condition in the adjustment lines 110 and 156, and responsively inputs a corresponding signal in signal transmission line 124 to the programmable logic controller (PLC) 126.

The dispensing line 108 is connected with dispensing line 128 by dual ported check valve 120. Dispensing line 128 contains three-way valve 132, pressure transducer 134, two-way valve 138, two-way manual valve 140 and pressure transducer 142. The pressure transducer 134 is joined in signal input relationship with the PLC 126 by signal transmission line 136. Pressure transducer 142 is correspondingly linked in signal input relationship with the PLC 126 by signal transmission line 144. Valve 138 is an automatic shutoff valve, and valve 140 is a manual shutoff valve.

The three-way valve 132 also is joined to purge gas line 148, having adjustable pressure regulator 172 and flow control orifice 174 therein. Adjustable pressure regulator 172 may for example comprise a Veriflo pressure regulator. The purge gas line 148 may be joined to a suitable source (not shown) of purge gas, such as nitrogen or other suitable purge gas species.

The adjustable pressure regulator 172 is coupled to a pressure sensor 176 which inputs a pressure sensing signal to the PLC 126 by signal transmission line 178. The purge gas line 148 is joined by branch line 150 with the venturi line 146. Venturi line 146 has vacuum switch 160 disposed therein. The vacuum switch 160 is joined by signal transmission line 162 to the PLC 126.

The venturi line 146 is joined to the venturi 164, which may be of any suitable type, as for example a Venturi Vacuum Generator (commercially available from AP Tech). The outlet of the venturi 164 is joined to venturi vent line 166. The inlet of the venturi is joined to venturi inlet line 168 having two-way valve 170 therein.

The flow control orifice 118 may be of any suitable type, as for example a Bird 0.004 inch VCR 3 liters per minute (1 pm) restricted flow orifice. The flow control orifice 174 likewise may be of any suitable type, e.g., a Bird 0.034 inch 25 l pm restricted flow orifice. It will be recognized that the components of the manifolded fluid storage and dispensing system in FIG. 6 may be widely varied, and that the manifold flow circuitry may be likewise varied in the broad practice of the present invention.

The operation of the manifolded fluid storage and dispensing system of FIG. 6 in one embodiment is described below, with respect to an illustrative sequence of process steps. In the following discussion, the term "pigtail" refers to the fill/dispensing and regulator adjustment lines as arranged to extend downwardly into the fluid storage and dispensing vessel.

Step 1. Couple vessel 102 to the manifold flow circuitry by connecting valves 120 and 114 with the lines from the valve head assembly 106.

Step 2. Start cycle purge by pumping and pressurizing the pigtail:

(1) open valve 170 to activate the venturi pump 164, open valve 130 to the pigtail, and open valve 120.

(2) when the vacuum as read by pressure transducer 134 reaches a desired level (e.g. 100 torr), close valve 130 to the pigtail.

(3) open valve 132 to the pigtail to pressurize the lines to the desired pressure (e.g. 20 psig).

(4) close valve 132 to the pigtail, and vent the pigtail by opening valve 130 to the pigtail.

(5) repeat steps (1) to (4) for 20 to 60 times.

(6) close valves 132 and 130 to the pigtail.

Step 3. Further pump the pigtail by opening valves 138 and 140, and by using a vacuum pump to outlet A (e.g. the tool pumps of a downstream semiconductor manufacturing facility).

Step 4. When the monitored pressure at pressure transducer 134 and 142 reaches a desired level (e.g. 0.1 torr), close valves 138 and 140.

Step 5. Venturi pump the vessel set pressure line 156 through valves 114 and 154.

Step 6. When EPR unit 122 reads a pressure of less than 600 torr, close valve 154.

Step 7. Open the vessel valves (both the gas discharge valve 120 and the set pressure port valve 114).

Step 8. If pressure transducer 134 reads less than 760 torr pressure, set EPR 122 to the desired level (e.g. 50 psig) through PLC 126 and valve 152.

Step 9. Open valve 138 and valve 140 to deliver gas from the vessel 102 to outlet A (e.g., to a downstream gas-using facility, such as a semiconductor manufacturing tool).

Step 10. When the vessel 102 is not being used (e.g., the downstream tool is in an idle, or non-consuming, mode), increase the EPR setting by 20 to 30 psig.

Step 11. If pressure transducer 134 responds to the pressure increase, then reset the EPR unit 122, and bleed the set pressure down to its original setting (e.g., 50 psig), so that no warning will be sent.

Step 12. If pressure transducer 134 does not respond to the pressure increase, then a near empty vessel warning will be sent by PLC unit 126.

The near empty vessel warning sent by PLC 126 may be of any suitable type, e.g., a visual alarm and/or sonic alarm.

In the manifolded fluid storage and dispensing system of FIG. 6, the various valves may be integrated with cycle time control means. For example, the PLC 126 may be programmably arranged to selectively operate the valves in the manifold in a cycle time sequence, to effect manifold purging, pressurization, active dispensing and pressure testing to determine the onset of depletion of the contained fluid in the storage and dispensing vessel 102.

The system of FIG. 6 therefore facilitates the monitoring of cylinder fill level by the process of increasing the set point regulator pressure and sensing the pressure level in the flow circuitry (manifold) associated with the vessel to determine responsive pressure increase in the flow circuitry. The pressure increase, or rate of increase, can then be monitored, to determine if such monitored characteristic is below that which corresponds to an adequate supply of fluid in the vessel. If the monitored characteristic is below such threshold, indicating that the supply of fluid is no longer adequate to generate the pressure rise, and/or rate of pressure rise, then such "onset of depletion" condition is outputted by an appropriate alarm, data log, or by actuation of shutoff or switchover mechanisms to take the depleted vessel off-line, and optionally to open a fresh vessel for continuity of operation.

In the fluid storage and dispensing apparatus and method of the invention, the fluid that is contained in and dispensed from the fluid storage and dispensing vessel may be any suitable fluid medium, held in the vessel at any appropriate fluid storage conditions. For example, the fluid may be a high pressure gas or alternatively a liquid, at the set point pressure determined by the fluid pressure regulator element(s), as the source of the gas to be dispensed. Thus, the gas source may be a high pressure gas or a liquefied gas, as necessary or desired in a given end use application of the invention.

The fluid utilized in the fluid storage and dispensing vessel of the invention may for example comprise a hydride fluid for semiconductor manufacturing operations. Illustrative hydride fluids of such type include arsine, phosphine, stibine, silane, chlorosilane, and diborane. Other fluids useful in semiconductor manufacturing operations may be employed, including acid gases such as hydrogen fluoride, boron trichloride, boron trifluoride, hydrogen chloride, halogenated silanes (e.g., $SiF_4$) and disilanes (e.g., $Si_2F_6$), etc., having utility in semiconductor manufacturing operations as halide etchants, cleaning agents, source reagents, etc.

Although the storage and dispensing vessel 12 shown in FIG. 1 is illustrated as being in an empty condition in the interior volume 18, prior to filling of the vessel with the fluid to be dispensed, it will be appreciated that the vessel may contain sorbent material(s) to remove impurities or contaminants from the fluid being stored in the vessel, or to sorptively retain the fluid being stored, for subsequent release (desorption) in the dispensing operation.

The various features and aspects illustratively disclosed herein may be utilized separately or in various permutations or combinations with one another, to provide a fluid storage and dispensing system constituting a useful source fluid apparatus for specific usage requirements.

Thus, while the invention has been illustratively described herein with reference to specific elements, features and embodiments, it will be recognized that the invention is not thus limited in structure or operation, but that the invention is to be broadly construed consistent with the disclosure herein, as comprehending variations, modifications and embodiments as will readily suggest themselves to those of ordinary skill in the art.

What is claimed is:

1. A fluid storage and dispensing system, comprising:
   a fluid storage and dispensing vessel enclosing an interior volume for holding a fluid, wherein the vessel includes an opening;
   a fluid dispensing assembly coupled in fluid flow communication with the opening and arranged for selective dispensing of fluid;
   an adjustable set point pressure regulator in the interior volume of the fluid storage and dispensing vessel, and arranged to flow fluid therethrough to the fluid dispensing assembly at a set point-determined pressure during said selective dispensing of fluid; and
   set point adjustment means exterior to the fluid storage and dispensing vessel, controllingly linked to the adjustable set point pressure regulator to selectively vary the set point of the adjustable set point pressure regulator.

2. The fluid storage and dispensing system of claim 1, wherein the set point of the regulator is fluidically adjustable.

3. The fluid storage and dispensing system of claim 2, wherein the set point adjustment means exterior to the fluid storage and dispensing vessel, comprise a fluid flow controller arranged to selectively transmit a pressure set point-determining pressure to the regulator.

4. The fluid storage and dispensing system of claim 3, wherein the fluid flow controller is coupled to the regulator by fluid flow circuitry.

5. The fluid storage and dispensing system of claim 3, wherein the pressure set point-determining pressure comprises a range of pressure from sub-atmospheric pressure to super-atmospheric pressure.

6. The fluid storage and dispensing system of claim 5, wherein the pressure set point-determining range is within a range of from about 1 Torr to about 2250 psig.

7. The fluid storage and dispensing system of claim 1, further comprising a valve head in the opening of the fluid storage and dispensing vessel.

8. The fluid storage and dispensing system of claim 7, wherein said valve head comprises a three port valve head, with a first fluid fill port, a second fluid discharge port, and a third fluid flow adjustment port for the regulator.

9. The fluid storage and dispensing system of claim 7, wherein said valve head comprises a two port valve head, with a first fluid fill/fluid discharge port, and a second fluid flow adjustment port for the regulator.

10. The fluid storage and dispensing system of claim 7, wherein the set point adjustment means exterior to the fluid storage and dispensing vessel, comprise a fluid flow controller coupled in flow communication with a fluid flow adjustment passage in the valve head, and wherein the fluid flow adjustment passage in the valve head is coupled with a fluid flow line interconnecting the fluid flow adjustment passage with the regulator, for pressure set point adjustment of the adjustable set point pressure regulator.

11. The fluid storage and dispensing system of claim 1, wherein the adjustable set point pressure regulator comprises a pressure-sensing assembly arranged for responsively expanding upon decrease of outlet pressure, and responsively contracting upon increase of outlet pressure, to thereby responsively maintain the pressure set point during dispensing.

12. The fluid storage and dispensing system of claim 1, wherein the set pressure regulator comprises a diaphragm element that is translatable in response to outlet pressure of the regulator, to thereby responsively maintain a selected set point pressure for said selective dispensing.

13. The fluid storage and dispensing system of claim 1, further comprising at least one particle filter in series flow relationship with the regulator in the interior volume of the fluid storage and dispensing vessel.

14. The fluid storage and dispensing system of claim 1, wherein the regulator is mounted on an extension tube in fluid flow communication with the fluid dispensing assembly, wherein the regulator controls pressure of fluid flowing from the interior volume of the vessel to the fluid dispensing assembly, and wherein a particle filter is mounted at an inlet portion of the extension tube and a second particle filter is mounted in the extension tube downstream from the regulator.

15. The fluid storage and dispensing system of claim 1, wherein the set point adjustment means comprise pneumatic adjustment means.

16. The fluid storage and dispensing system of claim 1, wherein the set point adjustment means comprise a source of pressurized gas for adjustment of the pressure set point of the regulator.

17. The fluid storage and dispensing system of claim 10, wherein the set point adjustment means comprise a source of vacuum for adjustment of the pressure set point of the regulator.

18. The fluid storage and dispensing system of claim 1, wherein the set point adjustment means are arranged to selectively vary the pressure set point of the regulator between sub-atmospheric pressure and super-atmospheric pressure.

19. The fluid storage and dispensing system of claim 1, wherein the set point adjustment means are manually actuatable.

20. The fluid storage and dispensing system of claim 1, wherein the set point adjustment means are automatically actuatable.

21. The fluid storage and dispensing system of claim 1, further comprising a pressure monitoring device coupled with the fluid dispensing assembly or a flow line downstream therefrom, and operatively coupled with the regulator in an arrangement providing indication of depletion of fluid from the fluid storage and dispensing vessel to a near-depleted condition.

22. The fluid storage and dispensing system of claim 1, further comprising a valve head in the opening of the fluid storage and dispensing vessel, wherein the valve head comprises a flow control valve in a fluid discharge flow path therein, and a valve actuator for the flow control valve.

23. The fluid storage and dispensing system of claim 22, wherein the valve actuator comprises a manual handwheel actuator.

24. The fluid storage and dispensing system of claim 22, wherein the valve actuator comprises an automatic valve actuator.

25. The fluid storage and dispensing system of claim 1, further comprising a fluid contained in the vessel interior volume selected from the group consisting of compressed liquefied gases and compressed gases.

26. The fluid storage and dispensing system of claim 1, further comprising a liquid contained in the vessel interior volume selected from the group consisting of arsine, phosphine, stibine, silane, diborane, hydrogen fluoride, boron trichloride, boron trifluoride, hydrogen chloride, halogenated silanes and disilanes.

27. The fluid storage and dispensing system of claim 1, further comprising a liquid contained in the vessel interior volume selected from the group consisting of arsine, boron trichloride and boron trifluoride.

28. The fluid storage and dispensing system of claim 1, further comprising a second set point pressure regulator in the interior volume of the fluid storage and dispensing vessel, in series with said adjustable set point regulator.

29. The fluid storage and dispensing system of claim 28, wherein the second set point pressure regulator is positioned upstream of said adjustable set point regulator so that fluid dispensed from the fluid storage and dispensing vessel flows through said second set point pressure regulator prior to flow through said adjustable set point regulator.

30. The fluid storage and dispensing system of claim 28, wherein the second set point pressure regulator is a fixed set point regulator that is non-adjustable in the interior volume of the fluid storage and dispensing vessel.

31. The fluid storage and dispensing system of claim 28, wherein the second set point pressure regulator is an adjustable set point regulator that is adjustable in the interior volume of the fluid storage and dispensing vessel.

32. The fluid storage and dispensing system of claim 31, wherein said set point adjustment means comprise means for independently adjusting each of said set point regulators.

33. The fluid storage and dispensing system of claim 29, wherein said second set point pressure regulator has a pressure set point in the range of from about 20 psig or about 2500 psig, and said adjustable set point regulator has a pressure set point in the range of from about 1 Torr to about 2500 psig, wherein the set point of said second set point pressure regulator is above the pressure set point of said adjustable set point regulator.

34. The fluid storage and dispensing system of claim 33, wherein the pressure set point of said second set point pressure regulator is at least twice the pressure set point of said adjustable set point regulator.

35. A fluid and dispensing system, comprising:
 a fluid storage and dispensing vessel enclosing an interior volume for holding a fluid, wherein the vessel includes an opening;
 a fluid dispensing assembly coupled in fluid flow communication with the opening and arranged for selective dispensing of fluid;
 an adjustable set point pressure regulator in the interior volume of the fluid storage and dispensing vessel, and arranged to flow fluid therethrough to the fluid dispensing assembly at a predetermined pressure set point during said selective dispensing of fluid; and
 means for coupling the adjustable set point regulator in the interior volume of the fluid storage and dispensing vessel, with a pressure set point adjusting means external to the fluid storage and dispensing vessel.

36. The fluid storage and dispensing system of claim 35, wherein said means for coupling the adjustable set point regulator in the interior volume of the fluid storage and dispensing vessel, comprise a fluid flow circuit interconnecting the adjustable set point regulator in the interior volume of the fluid storage and dispensing vessel, with the pressure set point adjusting means external to the fluid storage and dispensing vessel.

37. A fluid storage and dispensing system, comprising a flow circuit for gas dispensing, a fluid storage and dispensing vessel including an adjustable set point regulator disposed in the interior of the vessel and arranged for discharge of fluid from the vessel at a discharge pressure determined by pressure set point of the regulator, means for varying the pressure set point of the regulator, and means for monitoring pressure rise in the flow circuit while varying the pressure set point of the regulator to determine whether the vessel has reached or is approaching a fluid-depleted state.

38. The fluid storage and dispensing system of claim 37, wherein the monitoring means are operatively coupled to an alarm, whereby the alarm is actuated when the vessel has reached or is approaching a fluid-depleted state.

39. A method of supplying a fluid for use thereof, comprising:
confining the fluid in a fluid storage and dispensing vessel against an adjustable set point pressure regulator in the fluid storage and dispensing vessel, wherein the adjustable set point pressure regulator is arranged to flow fluid therethrough at a set point-determined pressure during dispensing of fluid from the fluid storage and dispensing vessel; and
selectively adjusting the set point of the adjustable set point pressure regulator from a locus exterior to the vessel, to provide a selected pressure set point subsequent to said adjusting.

40. The method of claim 39, comprising setting the set point of the adjustable set point pressure regulator to a sub-atmospheric pressure during storage or transport of the vessel prior to dispensing operation.

41. The method of claim 39, wherein said adjusting is from said sub-atmospheric pressure to a super-atmospheric pressure for said dispensing operation.

42. The method of claim 39, further comprising using dispensed fluid in semiconductor manufacturing.

43. The method of claim 39, wherein the fluid in the vessel is selected from the group consisting of compressed liquefied gases and compressed gases.

44. The method of claim 39, wherein the fluid in the vessel comprises a liquid selected from the group consisting of arsine, phosphine, stibine, silane, diborane, hydrogen fluoride, boron trichloride, boron trifluoride, hydrogen chloride, halogenated silanes and disilanes.

45. The method of claim 39, wherein the fluid contained in the vessel comprises a liquid selected from the group consisting of arsine, boron trichloride and boron trifluoride.

46. The method of claim 39, wherein the adjustable set point pressure regulator is arranged in series with a second pressure regulator.

47. The method of claim 46, wherein the second pressure regulator comprises a fixed set point regulator that is non-adjustable in the fluid storage and dispensing vessel.

48. The method of claim 46, wherein the second pressure regulator comprises an adjustable set point pressure regulator.

49. The method of claim 46, wherein fluid dispensed from the fluid storage and dispensing vessel is flowed to a semiconductor manufacturing apparatus.

50. A fluid storage and dispensing method, comprising:
providing a flow circuit for gas dispensing;
coupling with the flow circuit a fluid storage and dispensing vessel including an adjustable set point regulator disposed in the interior of the vessel and arranged for discharge of fluid from the vessel at a discharge pressure determined by pressure set point of the regulator; and
monitoring pressure rise in the flow circuit while varying the pressure set point of the regulator to determine whether the vessel has reached or is approaching a fluid-depleted state.

* * * * *